Sept. 2, 1941.　　　O. MITCHELL　　　2,254,380
VARIABLE-PITCH PULLEY
Filed May 8, 1940
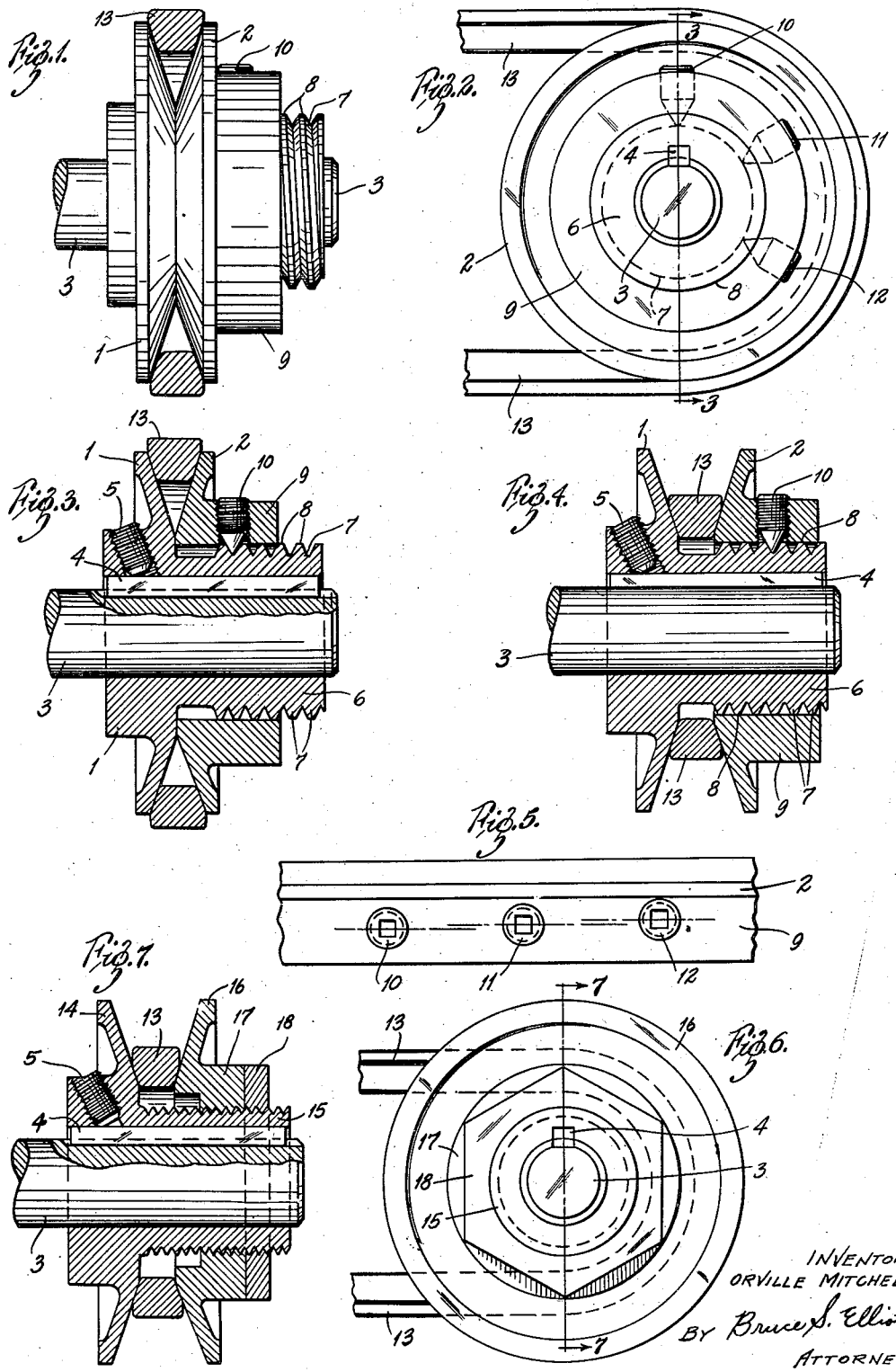
INVENTOR:
ORVILLE MITCHELL,
BY Bruce S. Elliott
ATTORNEY.

Patented Sept. 2, 1941

2,254,380

UNITED STATES PATENT OFFICE 2,254,380

VARIABLE-PITCH PULLEY

Orville Mitchell, Dallas, Tex.

Application May 8, 1940, Serial No. 333,904

7 Claims. (Cl. 74—230.17)

This invention has for its general object to provide a novel variable-pitch V-pulley, which shall allow of practically infinite adjustments and at the same time overcome disadvantages in the construction and operation of pulleys of this type now in use, and which require movement through an arc of a definite number of degrees in adjusting the pulley from one pitch to the next higher or lower pitch.

The type of conventional pulley referred to comprises two members each carrying one of the side walls of the V-belt groove. One of the pulley sections is set-screwed to the shaft and has an extended hub with external threads. The other pulley section has a threaded bore which screws onto the threaded hub of the first section. As the movable member is screwed up on the stationary member, the belt groove is narrowed; and as the movable member is unscrewed, the belt groove is widened. To permit the movable member to be locked in the desired adjusted position, two flat places are provided on opposite sides of the threaded hub. A set screw in the movable member is screwed down against either one or the other of the flat places, thereby locking the movable member in its desired adjusted position. Thus, in adjusting the movable section of the pulley, to vary the pitch thereof, it must be turned at least through a half of a revolution in one direction or the other, in order to bring the set screw from one flat place through an arc of 180° to the next flat place.

One of the objections to this type of pulley is that as all threads have some play in them, both endwise and radially, when the set screw is turned up to stop this play, the two pulley sections are cocked, and placed in distorted relationship with each other, thereby causing the pulley to run badly.

Another disadvantage is, that adjustments can be made only every half a revolution, if two flat places are provided, and it is not practicable to use more than two flat places. In other words, in making an adjustment, the movable pulley section must be turned through an arc of at least 180°, and no intermediate adjustment is possible.

In one form of my invention, I overcome these disadvantages by simply extending the length of the externally screw threaded hub of the fixed section of the pulley, and mount a jam nut thereon, eliminating the flat places on the hub and the set screw mounted in the movable section of the pulley for engaging such flat places. As soon as the two pulley members are properly set to obtain the desired belt width, the jam nut is run home, locking the adjustable pulley section in the desired location.

It will be readily seen that with the use of the jam nut, the play between the threads is taken up uniformly all around. There is no cocking of the parts nor any distortion of the relationship between the two members. Moreover, any minute gradation of adjustment is permissible as the movable section of the pulley can be set wherever desired and then locked in position with the jam nut.

In another, and the preferred form of the invention, I employ what may be termed a retractable internal thread for engaging the threads on the hub of the fixed pulley section, such thread being composed of pointed set screws, these set screws being arranged in a spiral around a portion of the hub, the spiral being of the same pitch as the threads around the hub. These latter threads are provided with coarse, flat-top threads, and the extended hub of the movable section is bored out to snugly embrace the threaded surface of the hub of the fixed pulley section.

To adjust the width of the groove in the pulley the set screws are unscrewed for a slight distance, and the movable section rotated in one direction or the other according to the adjustment desired, in which movement the set screws engage with the external threads on the hub, in the same manner as a continuous thread would act, and after the adjustment, these set screws are turned firmly into engagement with the bottoms and walls of the grooves between the threads on the hub, thereby securing and maintaining the movable section of the pulley in the desired position. As there is no play between the retractable thread and the external threads on the hub on the fixed pulley section, and as the bore of the hub on the movable section snugly embraces the flat tops of these threads, no cocking, or relative displacement between the two sections of the pulleys result from securing the movable section in any adjusted position on the threaded hub of the fixed section of the pulley. Moreover, the movable section of the pulley may be adjusted relative to the fixed section to any degree within a substantially infinite number of gradations; and the adjustments may vary in degree from one effected by a minute partial rotation of the movable section, to one effected by rotating the movable section to separate the pulley sections to the maximum allowable distance.

In the accompanying drawing:

Fig. 1 is a view in elevation of my improved pulley mounted on a shaft, with the pulley sections adjusted to provide a groove of the minimum allowable width;

Fig. 2 is a view in side elevation of the same;

Fig. 3 is a vertical sectional view taken on the line 3—3 of Fig. 1 and viewed in the direction of the arrows;

Fig. 4 is a similar view, but showing the movable pulley section adjusted to provide the maximum width of pulley groove;

Fig. 5 is a developed plan view illustrating the spiral arrangement of the set screws forming the retractable internal thread in the movable section of the pulley.

Fig. 6 is a view in side elevation illustrating a modification in which a jam nut is employed for locking the movable section of the pulley in any adjusted position to which it may be turned; and Fig. 7 is a vertical sectional view on the line 7—7 of Fig. 6.

Referring now to the first five figures of the drawing, the numerals 1, 2 indicate, respectively, the two pulley sections. Section 1 is keyed to a shaft 3 at 4, and is provided with a set screw 5 to hold the key in place and to prevent endwise movement thereof. Pulley section 1 also has an extended hub 6, which is provided with coarse threads 7 having flat peripheral edges 8.

The pulley section 2 is also provided with an extended hub 9 which surrounds the extended hub 6 of section 1. The hub 9 is bored out and reamed to fit snugly on the flat circular threaded surface of the hub 6.

To provide for adjusting pulley section 2 relative to pulley section 1, the hub member 9 of the former is provided with a plurality of pointed set screws 10, 11, and 12. These set screws, as diagrammatically shown in Fig. 5, are arranged in a spiral around a portion of the hub 9, the spiral being of the same pitch as the threads 7 on the hub 6. Thus, the three pointed set screws are, in effect, the equivalent of a segmental internal thread corresponding in pitch to and engaging with, the external thread 7 of the hub 6, but at the same time being an internal thread that may be retracted at will by unscrewing slightly the set screws 10, 11 and 12 to release them from binding engagement with the thread 7 while permitting them to track in the grooves thereof when the pulley section is to be adjusted. In such adjustment, the set screws 10, 11 and 12 having been slightly retracted, the hub 9 is permitted to be screwed up or screwed out, as desired, upon the hub 6. When the desired relative position of the pulley sections 1 and 2 is obtained, the set screws are run home into the grooves of the thread 7, thereby securing and maintaining the desired position.

It will be seen that instead of obtaining adjustments only in degrees corresponding to half revolutions of the movable pulley section, as is the case with variable pitch pulleys in general use, my invention permits an infinite number of intermediate settings. As previously described, this conventional pulley has two flat places on the stationary hub to act as landings for the set screw in the movable member; once the member is turned so that the set screw leaves one flat place, it can not be adjusted until the set screw reaches the next landing, half a revolution away. From the above description of my improved pulley, it will be readily apparent that there are no fixed limits of adjustment, and that the movable pulley section can be secured in its adjusted position when turned through any desired arc of movement.

Since the set screws act as a retractable internal thread, my invention provides, in effect, loose fitting threads for adjustment purposes and very tight fitting threads for running purposes. That is to say, the internal threads, comprising the set screws 10, 11 and 12, are retracted sufficiently by unscrewing to permit quick and easy adjustment, and then are screwed down very tight when the desired adjustment is obtained and the pulley is ready to run. With other variable-pitch V-pulleys of the type referred to, the threads have to be loose-fitting enough to permit easy screwing in or out, which makes them too loose for properly securing the movable pulley section in place for operation; that is to say, when the set screw is run home, the play is taken up in one direction and the pulley sections assume a cocked relationship toward each other.

While I have referred to the loose fitting of the threads for adjustment purposes, it should, at the same time, be understood that there is practically no play between the flat edges 8 of the thread 7 and the reamed out bore of the hub 9, as the fit between these two members is quite snug, although this fit is not so close as to prevent the pulley section 2 from being readily turned.

While I have shown three set screws, two or four or even a greater number, could be used. Three, however, seems to be an ideal number for the purpose, and I find it desirable to follow the usual engineering practice of locating all three screws in the same side of the hub. In practice these screws are set 60° apart.

It will of course be understood that when the width of the groove in the pulley is widened or narrowed, as the case may be, the V-belt 13 will assume a higher or lower position in the groove of the pulley, and that the pitch of the pulley will be determined by the position of the belt in the groove.

Referring now to Figures 6 and 7, the fixed hub section 14, corresponding to the hub section 1 of the previous figures is provided with an extended externally threaded hub 15 on which is mounted the movable hub section 16, corresponding to the pulley section 2 of the previous figures. This pulley section also has a slightly extended hub 17, internally threaded to screw on the extended hub 15. The numeral 18 indicates a jam nut, which is also internally threaded to screw on the hub 15. In adjusting the pulley, the jam nut 18 is unscrewed and the pulley section 16 is rotated to the desired extent to secure the adjustment desired, after which, the jam nut is turned up against the outer end of hub 17 to lock pulley section 16 in position.

It is obvious that both the preferred and modified constructions I have described possess the advantages of adjustment unrestricted in degree, and the prevention of distortion between the two sections of the pulley when the movable section is locked in position. Each form of the invention is characterized by rotatable means engaging the threads on the extended hub of the fixed pulley section and forming a lock between said threads and the adjustable section of the pulley.

I claim:

1. A variable-pitch pulley comprising a pulley section having an extended, externally screw-threaded hub, the peripheral edges of the threads being flat, a second pulley section having an extended hub provided with a bore receiving and snugly engaging the flat threads on the extended hub of the first-named pulley section, and means, retractable at will, carried by the hub of the second pulley section and having threaded engagement with the screw-threads on the extended hub of the first-named pulley section.

2. A variable-pitch pulley comprising a pulley section having an extended, externally screw-threaded hub, the peripheral edges of the threads being flat, a second pulley section having an extended hub provided with a bore receiving and snugly engaging the flat threads on the extended hub of the first-named pulley section, and retractable internal threads carried by the hub of the second pulley section and engaging with the screw-threads on the extended hub on the first named pulley section.

3. A variable-pitch pulley comprising a fixable pulley section having an extended hub providing continuous flat engaging surfaces, a second pulley section having an extended hub provided with a bore receiving and snugly engaging the flat surfaces on the extended hub of the first-named pulley section, and adjustable thereon, and retractable means carried by the extended hub of the second-named pulley section and adapted to be moved into locking engagement with the extended hub of the first-named pulley section.

4. A variable-pitch pulley comprising a fixable pulley section having an extended, externally screw-threaded hub, the peripheral edges of the threads being flat, a second pulley section having an extended hub provided with a bore receiving and snugly engaging the flat threads on the extended hub of the first-named pulley section, and having a retractable internal thread engaging the threads on the extended hub to permit the second pulley section to be adjusted in gradations unlimited in extent with reference to the first-named pulley section when retracted, and to lock the second pulley section in fixed position on the extended hub of the first-named pulley section when moved into binding engagement with the threads thereof.

5. A variable-pitch pulley comprising a fixable pulley section having an extended, externally threaded hub, the peripheral edges of the threads being flat, a second pulley section having an extended hub provided with a bore receiving and snugly engaging the flat threads on the extended hub of the first-named pulley section, and having a sectionally retractable internal thread engaging the threads on the extended hub to permit the second pulley section to be adjusted in gradations unlimited in extent with reference to the first-named pulley section when retracted, and to lock the second pulley section in a fixed position on the extended hub of the first-named pulley section when the sections of said thread are moved into binding engagement with the threads of the latter extended hub.

6. A variable-pitch pulley comprising a fixable pulley section having an extended, externally screw-threaded hub, the peripheral edges of the threads being flat, a second pulley section having an extended hub provided with a bore receiving and snugly engaging the flat threads of the extended hub of the first named pulley section, and a series of pointed set-screws mounted in the hub of the second pulley section and arranged around a portion of said hub in a spiral having the same pitch as the threads on the hub of the fixable pulley section, and the pointed ends whereof engage in the grooves of said threads, whereby said set-screws may be slightly retracted, while maintaining such engagement, to permit the second pulley section to be moved by rotation toward or from the fixable pulley section in gradations unlimited in extent, and may then be turned into binding engagement with the threads on the hub of the fixable pulley section to lock the second pulley section in fixed position relative to the first pulley section.

7. A variable-pitch pulley comprising a fixable pulley section having an extended hub provided with external screw-threads having flat peripheral edges, a second pulley section having a hub bored to receive and snugly engage the threaded portion of said extended hub, and retractable means carried by the hub of the second pulley section and providing threaded engagement with said extended hub and adapted to be retracted to permit adjustment by rotation of the second pulley section in gradations unlimited in extent with reference to the fixable pulley section, and to be moved into binding engagement with the threads on the extended hub to lock the second pulley section in fixed adjusted position on the latter.

ORVILLE MITCHELL.